United States Patent Office 2,824,818
Patented Feb. 25, 1958

2,824,818

WELDING OF METALS HAVING HOT-SHORT CHARACTERISTICS

Oscar E. Swenson, Annapolis, Md.

No Drawing. Application October 15, 1954
Serial No. 462,633

5 Claims. (Cl. 148—4)

(Granted under Title 35, U. S. Code (1952), sec. 266)

The invention described herein may be manufactured and used by or for the Government of the United States of America for governmental purposes without the payment of any royalties thereon or therefor.

The present invention relates to a method of welding and more particularly, to a method of welding metals having a characteristic commonly identified as "hot-short."

In welding hot-short metals and particularly silicon Monel, it has heretofore been extremely difficult to produce a crack-free weld. Such metals, however, possess certain physical properties, which make their use desirable for structures normally immersed in sea water such as, for example, ship propeller blades and for similar equipment where corrosion resistance is necessary. These metals however, cannot be readily welded. The seriousness of the problem becomes apparent when considered in view of an expensively constructed ship propeller. Castings of large propellers frequently have defects which should be corrected before the propellers are put into use. Even after being put into service, they suffer damage or wear which requires repair. In order to maintain the efficiency of the propellers it is desirable to obviate such defects, damages or wear, which may be in the form of cracks, nicks, galling, pitting, etc. The problem is particularly acute with respect to silicon Monel. Conventional welding produces crack development in the base metal, although at times they may be so small as to escape detection by modern detecting means, or produces a fusion zone extremely sensitive to corrosion, or results in porosity in the weld deposit.

One object of the invention is to provide a method of welding base metals and metal alloys which produces sound weldments.

Another object of the invention is to provide a method of welding metals having a characteristic commonly identified as hot-short.

A further object is to provide a method of producing crack-free welds in hot-short metals that have a high resistance to corrosion in sea water.

Still another object of the invention is to provide a method having special advantages in welding silicon Monel having a relatively high silicon content, that is above 1.6% silicon such as for example "S" Monel.

Other objects and many of the attendant advantages of this invention will be readily appreciated as the same becomes better understood by reference to the following detail description.

In accordance with the teachings of the instant invention, a new method is provided for welding base metals and metal alloys. The invention has unexpected advantages for the welding silicon Monel which has a hot-short characteristic, but it will be apparent that broadly the method may also be practiced in the welding of other metals and alloys.

It is to be noted that in accordance with the prevalent views in the welding art, a metal, either pure or alloy, having a hot-short characteristic is defined as one which becomes brittle and has low ductility when raised to elevated temperatures. An example of such metals is silicon Monel. Other examples include copper base alloys such as Phosphor bronze and aluminum bronze, and certain high alloy steels such as armor plate and austenitic stainless steel. The state or condition of the metal when reaching such temperatures is sometimes referred to as a hot-short condition.

In the description below, the welding method is described in relation to silicon Monel. This metal comprises an alloy having different percentages of various elements. An analysis of one typical test propeller composed of silicon Monel had the following chemical composition: Carbon 0.06%; manganese 0.78%; silicon 3.47%; copper 29.54%; iron 1.59%; aluminum 0.65%; nickel 63.91%; titanium less than 0.01%. However, in this alloy, these percentages usually vary in different amounts. As an example, in a typical silicon Monel alloy, the percentage of copper may range between 26 to 31% while the amount of nickel may vary between 61 to 69%. Since the exacting limits are unknown to the inventor, the above values are to be considered as representative rather than limiting. The invention however may be considered from the viewpoint of the hot-short condition exhibited by a metal, rather than from the particular composition of the metal.

Under the teachings of the present invention, the metal is first prepared for welding in the conventional manner. That is, in an instance where two parts are to be joined, or a crack or hole is to be filled in a single member, the areas to be adjoined are formed to present a suitable welding joint. Preferably, a joint for silicon Monel is formed as a conventional double-V of 60° included angle, and with a small root opening of about, for example, ⅛" in width. The latter, of course will vary in accordance with the different sizes and shapes of the material to be welded. A Monel backing rod should be used at least initially. It will be obvious that the welding joint may be formed in the shape of a single-V, butt joint, or any other conventional joints and that these will serve satisfactorily although it was found that by the use of a double-V type welding joint, successive incremental welds may be made alternately on opposite sides of the weld. This procedure, as will hereinafter be described, allows the stresses appearing during the welding process to be equalized and therefore lessens the possibility of crack development in the weld.

After the weld faces are prepared, the heat-affectable area, that is the area comprising the joint to be welded and a small adjacent area, is peened. This term, as defined herein, means the mechanical cold working of the metal in a manner such that the metal would be pockmarked in the event that it comprised a relatively soft or ductile metal. A suitable tool for this work is a conventional ball peen hammer. It will be apparent that in instances where the metal comprises a very hard material no visual markings will be made in the metal during this step. However, the primary function of this peening step is to place compression stresses in the metal for compensation of the tensile stresses that appear in the area during deposition of the weld metal, and, further, to increase the toughness and yield strength in the crack sensitive or fusion areas adjacent to the weld zone. Preferably, the faces of the angle joint and if available about a 1–1½" area beyond either side of the joint scarfs are heavily peened.

The affected area or the area to be welded is then cooled to a sub-zero temperature of a minimum of approximately minus 40 degrees Fahrenheit. While a colder temperature, that is, a temperature lower than approximately −40° F. would serve as well in the welding method, it was found that excellent results were obtained at this temperature. It is noted that the exact critical temperature for cooling was not accurately determined in the testing of the welding process, but it was in the vicinity of −40° F. But the operable temperature may be significantly higher, as for example as much as minus 25° F., more or less.

In order to obtain the desired cooling, the structure is preferably packed in Dry Ice, i. e. solid carbon dioxide ($CO_2$). For this purpose, a suitable container, such as, for example, a canvas bag, is provided with means for readily opening and closing of the bag. Dry Ice and the structure to be welded are placed in the container, with the Dry Ice completely surrounding the structure to be welded. When the temperature of the structure has cooled to the desired temperature, the time being dependent upon the physical size of the structure, the structure is in condition to be welded. It was found by test that an empirical formula for the total quantity of Dry Ice generally needed may be given as approximately one pound of Dry Ice for each pound of structure weight. This provided sufficient cooling to reduce the temperature of the structure an adequate amount in a relatively short period of time. This time varied considerably with the size and general configuration of the structure to be welded and in the instance of a medium-small propeller blade composed of silicon Monel metal, the initial time required for cooling was one hour.

It will be noted that the cooling process may be accomplished by other cooling mediums such as for example, liquid nitrogen or liquid helium. However, it is preferred that the cooling medium used be capable of serving the additional function of reducing the atmosphere in the area of the weld; that is, replacing the normal mixture of air in the atmosphere with a gaseous mixture containing a large percentage of normally inert substances. When Dry Ice is used as a cooling medium, the generation of gaseous carbon dioxide as the solid carbon dioxide sublimes, serves to reduce or displaces the normal atmosphere.

After the structure has cooled to an adequate sub-zero temperature, the container carrying the structure and Dry Ice is opened and the Dry Ice removed from the affected area to be welded. A small weld increment of filler metal is then deposited in the affected area. The size of this increment is desirably not over two inches in length for an average structural thickness of say, for example, 1 inch. With a thinner structure, the incremental deposit should be made shorter. The incremental length will vary with the thickness of the metal to be welded, but lengths of over three inches are not recommended.

Immediately after depositing the increment of filler metal, the weld deposit is cleaned of the slag which normally accumulates on a weld. This slag generally consists of the flux material that is incorporated with a conventional welding rod. Cleaning may be accomplished by a wire brush, chisel, chipping hammer or any other conventional cleaning utensil. After cleaning, the weld deposit is cooled with a Dry Ice or other cooling medium to obtain a rapid quench of the deposit and prevent building-up of thermal stresses.

After the deposit is cleaned and quickly quenched, heat-affected area and the deposit are peened as indicated above with relation to the initial preparation of the base metal. Then the structure is again enclosed in its cooling medium and the container closed.

It is to be noted that when the incremental deposit of filler metal is applied, the structure is not removed from the container, but rather, the cooling medium is removed from the area of the weld a sufficient amount to permit access to the affected area.

When the heat-affected area has again cooled to its sub-zero temperature, which may take in the order of 10 minutes for a 2" increment, the procedure is repeated in that a small increment of filler metal is deposited as an extension of the first increment in joint being welded; the deposit is cleaned, quickly quenched; and the heat-affected area peened and then again cooled to its sub-zero temperature. The steps are thus repeated until the full length of the joint has been formed. Then a second layer is superimposed in similar increments when the thickness of the structure requires it. For a 1 inch thick structure, as many as twelve layers or more are desirable.

For a weld-joint of the double-V type, it is preferable to deposit a single layer or at most two layers of filler metal on one side of the joint, and the succeeding layer of filler metal on the opposite side; then alternating from one side to the other until the weld joint is completed. This procedure is advantageous in that the area stresses produced in the affected by the weld tend to be equalized, so that the possibility of crack development is minimized.

Preferably, the conventonal metal-arc welding process is used to deposit the filler metal but it is obvious that other are welding processes may be employed, such as for example, inert gas shielded tungsten arc process. Care should be exercised in using the metal-arc process in that the arc should not be directed onto the base metal but rather upon the previously deposited weld metal so as to prevent premature heating of the base metal. To strike the arc, it was found that a striking plate is desirable in making the initial or first passes.

While it is believed that other welding electrodes may be used, a welding electrode manufactured by the International Nickel Co. and obtainable as their "130X Monel" electrode was used in welding tests and found to be satisfactory. This electrode is formed of normal Monel metal and is provided with a flux coating.

The following is a concise outline of an exemplary process for welding cast silicon Monel in accordance with the teachings of the invention.

(a) Preparation of base metal:
   (1) Double-V, 60° included angle joint butted with a ⅛" root opening fitted with a ³⁄₁₆" size 43 Monel rod backing.
   (2) Peen heavily the faces of the joint and a 1" wide area to either side of the joint scarfs.
   (3) Pack assembly in a canvas bag with sufficient Dry Ice to reduce the base metal temperature to 40° F. below zero in about an hour, as indicated by a heavy frost deposit. About one pound of Dry Ice will be required for each pound of casting encased in the canvas bag.

(b) Metal-arc welding:
   (1) Securing the backing rod.
      a. For sections of cast silicon Monel over ½" in thickness, use ⅛" diameter 130X Monel electrodes at reverse polarity and the current rate of 100 amperes, to tack the backing rod into position; then quench with Dry Ice and peen the base metal adjacent the tacks; cover and allow 5 or 10 minutes for areas welded to chill until covered by a frost.
      b. For sections under ½" in thickness, apply the above procedure using a ³⁄₃₂" diameter 130X Monel electrode at 65 amperes.
   (2) Root passes and second layers.
      a. Incremental lengths of not over 1" in length, repeating the quench and peen operations followed by the application of Dry Ice for each increment.
      b. Complete the root pass and second layer for one side, then reverse the assembly to chip out the backing rod and proceed as in (b)(2)a.
      c. Care must be exercised that the arc is not directed onto the base metal but onto the backing rod or previously deposited weld metal. A striking plate is useful in starting the arc for root passes.

(3) Subsequent layers.
   a. For assemblies over ½" in thickness, the subsequent layers may be completed with 5/32" diameter 130X Monel electrodes at 150 amperes, depositing increments not over 2" in length, observing the precaution in (b)(2)c.
   b. For assemblies under ½" in thickness the subsequent layers must be completed with the 3/32" diameter 130X Monel electrodes, depositing increments not over 1" in length and exercising the precaution in paragraph (b)(2)c.

In a careful X-ray examination of a welded silicon Monel propeller, the composition of which was given hereinbefore as typical, it was found that the weld made by the above-stated method was free of cracks and porosity. Mechanical tests made on the weld joint indicated a transverse tensile strength of approximately 65,000#/sq. in. and a yield strength of 54,300#/sq. in. The latter values can be raised by using a higher tensile strength welding electrode. Moreover, in an actual test, a 5" diameter silicon Monel disc, welded in the prescribed method, was rotated at 1200 R. P. M. for 60 days in sea water having a temperature of 81° F. After the test, an examination showed little effect from corrosion. A similar shaped manganese bronze disc simultaneously tested showed considerable erosion. These tests showed that the fusion zone, i. e. area between base metal and filler metal, of the weld made by the prescribed method has a high resistance to corrosion in sea water.

It is apparent therefore that the present invention discloses a method of welding hot-short metals which have heretofore been considered unweldable and that the welds produced by this method are free of crack development, have a high resistance to sea water corrosion, and are clear of porosity.

Obviously many variations of the present invention are possible in the light of the above teachings. It is therefore to be understood that within the scope of the appended claims, the invention may be practiced otherwise than as specifically described.

What is claimed is:

1. A method of arc welding metals that have the characteristic of being more brittle at arc welding temperatures than at normal room temperature, comprising the steps of peening the edges to be welded and an area immediately adjacent to said edges to the extent necessary to place compression stresses in the metal sufficient to compensate for tensile stresses developed during heating to welding temperature, cooling said peened edges and area to a sub-zero temperature of at least −40° F., arc welding a small increment of weld metal between said edges, removing the accumulated welding slag from the deposited metal, quenching the welded area and the area immediately adjacent thereto to a temperature of at least −40° F., and repeating the above sequence of steps to lay down successive weld increments until said weld is completed.

2. A method of arc welding metals exhibiting a hot-short characteristic including silicon Monel, Phosphor bronze and aluminum bronze, comprising the steps of mechanically peening the edges to be welded, and an area immediately adjacent to said edges, to the extent necessary to place compression stresses in the metal sufficient to compensate for tensile stresses developed during heating to welding temperature, cooling said peened edges and area to a sub-zero temperature of at least −40° F., arc welding a small increment of weld metal between said edges, removing the accumulated welding slag from the deposited metal, quenching the welded area and the area immediately adjacent thereto to a temperature of at least −40° F., and repeating the above sequence of steps to lay down successive weld increments until said weld is completed.

3. A method of arc welding metals that have the characteristic of being more brittle at welding temperatures than at room temperature, including silicon Monel, Phosphor bronze and aluminum bronze, comprising the steps of peening the edges to be welded, and an area immediately adjacent to said edges, to the extent necessary to place compression stresses in the metal sufficient to compensate for tensile stresses developed during heating to welding temperature, cooling said peened edges and area to a sub-zero temperature of at least −40° F., arc welding a small increment of weld metal between said edges, removing the accumulated welding slag from the deposited metal, quenching the welded area and the area immediately adjacent thereto to a temperature of at least −40° F., and repeating the above sequence of steps to lay down successive weld increments until said weld is completed.

4. A method of welding a structure made of a metal that is more brittle at arc welding temperatures than at room temperature, including silicon Monel, Phosphor bronze and aluminum bronze, comprising the steps of preparing a double-V welding joint at the area to be welded, mechanically peening the edges to be welded and an area of said structure immediately adjacent to said edges at least to the extent necessary to place compression stresses in the metal sufficient to compensate for the tensile stresses developed during heating to welding temperature, cooling the affected area of the structure to a sub-zero temperature of at least −40° F., depositing an increment of weld metal on one side of the double-V welding joint, and quenching the weld deposit with a cooling medium, cooling the welded area and the area adjacent thereto to a sub-zero temperature to at least −40° F., peening the weld increment to the extent set forth above, depositing an increment of weld metal on the other side of the double-V joint, and quenching the latter increment of weld metal to a temperature of at least −40° F., and repeating the above sequence of steps until the weld joint is completed.

5. A method of arc welding metals that have the characteristic of being more brittle at arc welding temperatures than at room temperature, including silicon Monel, Phosphor bronze and aluminum bronze, comprising the steps of peening the edges to be welded and an area immediately adjacent to said edges at least to the extent necessary to place compression stresses in the metal sufficient to compensate for the tensile stresses developed during heating to welding temperature, tack welding a backing rod to said edges, said rod occupying a space between said edges, peening the area around said tack welds to the extent set forth above, cooling said peened areas to a temperature of at least −40° F., depositing an increment of weld metal between said edges by directing the arc on to said backing rod only, removing the accumulated welding slag from the deposited metal, quenching the welded area by use of a cooling medium to a temperature of at least −40° F., and peening said area to the extent set forth above, depositing a second layer of weld metal, peening and quenching said second layer to the extent set forth above, removing said backing rod and repeating the above sequence of steps until the weld is completed.

No references cited.